United States Patent [19]

Orain

[11] 4,317,602
[45] Mar. 2, 1982

[54] METHOD AND DEVICE FOR ASSEMBLING IN PARTICULAR A ROLLER WITH A JOURNAL WITH INTERPOSITION OF NEEDLES

[75] Inventor: Michel A. Orain, Conflans Ste Honorine, France

[73] Assignee: Glaenzer Spicer, Poissy, France

[21] Appl. No.: 151,168

[22] Filed: May 19, 1980

[30] Foreign Application Priority Data

May 21, 1979 [FR] France ................................. 79 12899

[51] Int. Cl.³ .............................................. F16C 19/26
[52] U.S. Cl. ......................... 308/207 R; 308/DIG. 11
[58] Field of Search ................... 308/207 R, DIG. 11, 308/189 R, 207 A, 202, 216

[56] References Cited

U.S. PATENT DOCUMENTS

| | | | |
|---|---|---|---|
| 3,660,989 | 5/1972 | Pitner | 308/207 R |
| 3,881,792 | 5/1975 | Orain | 308/DIG. 11 |
| 4,062,603 | 12/1977 | Orain | 308/DIG. 11 |
| 4,236,767 | 12/1980 | Feldle | 308/DIG. 11 |

*Primary Examiner*—Lenard A. Footland
*Attorney, Agent, or Firm*—Schuyler, Banner, Birch, McKie & Beckett

[57] ABSTRACT

The process comprises placing on the journal the roller provided with its needles and the annular member for axially retaining the needles. Thereafter, one end of an elastically yieldable ring is engaged in a passageway provided on the journal and the ring is shifted along this passageway until it is completely received in a groove. This method is much more reliable and lends itself to a thorough automatization.

3 Claims, 5 Drawing Figures

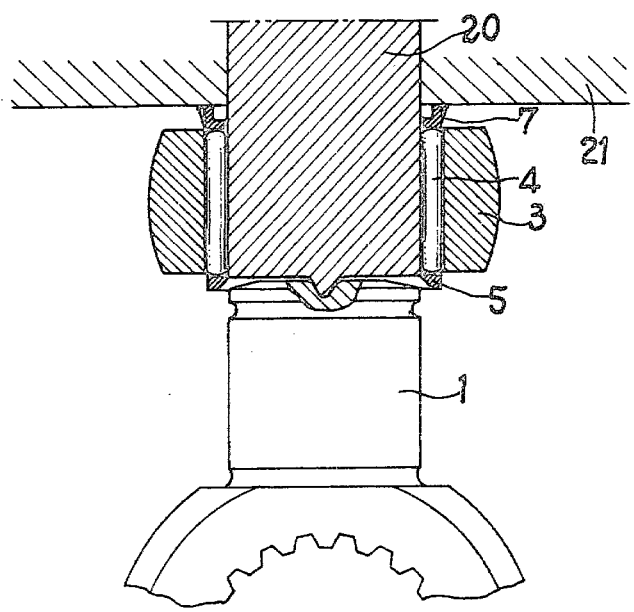

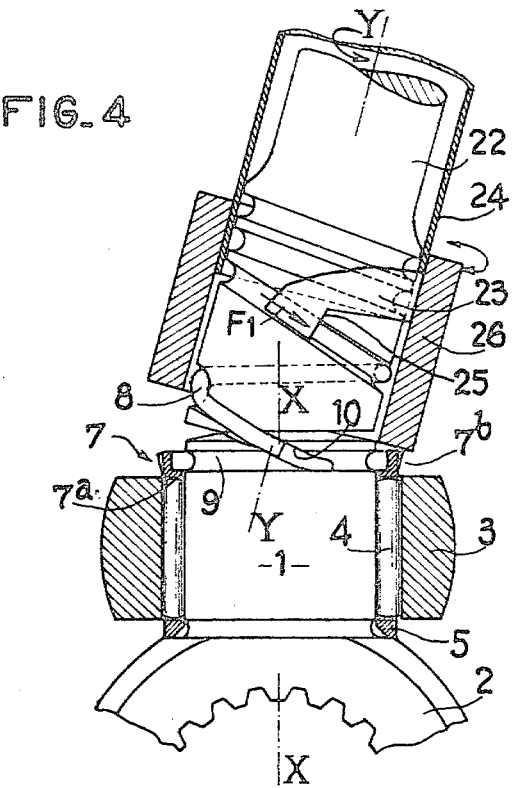
FIG_4
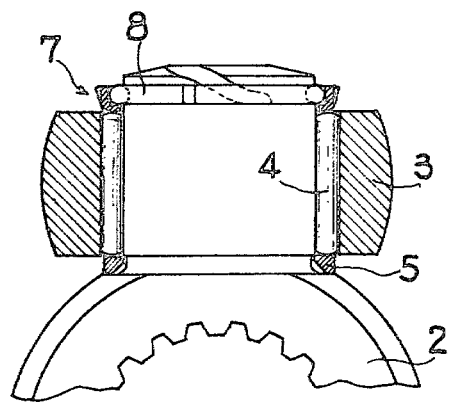
FIG_5

METHOD AND DEVICE FOR ASSEMBLING IN PARTICULAR A ROLLER WITH A JOURNAL WITH INTERPOSITION OF NEEDLES

The present invention relates to arrangements of the type in which a member such as a roller is rotatively mounted on a journal with interposition of rolling elements such as needles which are retained by axial retaining means.

Such arrangements are in particular employed in the construction of tripod type homokinetic joints having a very free sliding action widely employed in the lateral transmissions of automobile vehicles.

In French Pat. No. 2 079 747 of Oct. 18 1971, the Applicant proposed an assembly which permits achieving a high capacity, small overall size and absolute safety in operation and in which a split elastically yieldable ring is received in a semi-circular groove machined in the journal or trunnion of the tripod and trapped in this groove by the longitudinal flange of an L-section cup whose radial flange is retained between the ring and the needles received between the journal and the bore of the roller. The roller is maintained axially in position on the journal by the circular groove machined in the tulip element of the homokinetic joint. The needles are thus retained axially in an absolutely reliable manner between the cup and a bearing washer since there is achieved a cascade locking of the ring retaining the axial thrust of the needles. Even if this ring is deformed or breaks, it remains maintained in the housing therefor, defined by the groove of the journal and the cup, and consequently continues to perform its function.

However, this cascade locking implies a given order of assembly which complicates the mounting operation and does not permit an automatic mounting as would be desirable for mass production and for achieving the required reliability. This order of assembly is the following, starting with the bare journal:

1. The axial support washer for the needles is placed on the journal.
2. The cup is disposed near the middle of the bearing surface of the journal.
3. The ring is placed in its groove.
4. The ring is covered with the cup.
5. The correct number of needles are disposed around the journal between the support washer and the cup.
6. Finally the roller is positioned by causing it to slide axially and compress radially inwardly a small boss provided on the cap and which normally projects for retaining the roller.

An object of the invention is to improve an assembly such as that described hereinbefore which permits the adoption of a much simpler mounting method which lends itself to a thorough automatization.

The invention provides an assembly comprising a journal, a roller rotatively mounted on the journal with interposition of rolling elements such as needles which are retained axially between a radial support surface of the journal and an annular member near to the free end of the journal and retained by an elastically yieldable ring which is planar in the free state thereof and trapped between the groove of the journal and the annular member, wherein the journal comprises, between the free end thereof and said groove, a passageway which has a roughly helical shape and a depth which is such that it defines with the adjacent annular member a gap enabling the elastically yieldable ring to be introduced.

The angle between this passageway and the groove in the region of their connection is preferably between about 5 and 30°.

Another object of the invention is to provide a method for achieving such an assembly and comprising placing in position on the journal the roller provided with its needles and the axial retaining annular member, then engaging one end of the elastically yieldable ring in the passageway provided on the journal, and shifting the ring along said passageway until it is completely received in the groove in which it resumes its planar shape.

In its various aspects, the invention will be described in more detail hereinafter with reference to the accompanying drawings in which:

FIG. 1 is an axial sectional view of an assembly according to the invention but without the elastically yieldable ring;

FIG. 2 is a sectional view of the journal taken on line 2—2 of FIG. 1;

FIGS. 3 and 4 illustrate two stages of the assembling method, and

FIG. 5 shows the finished assembly.

FIG. 1 shows an assembly according to the invention which comprises a journal 1 which is part of a tripod 2 in the chosen example. Mounted on this journal is a roller 3 with interposition of needles 4, the latter being axially retained between a washer 5, which bears against a radial shoulder 6 of the tripod, and the radial flange 7a of an annular member or cup 7. This cup also has an axial skirt 7b on which there are provided projecting portions or ears 7c which are adapted to retain the roller 3. This assembly is completed by a split ring 8 which must be received in a groove having a semi-circular section and formed in the vicinity of the end of the journal. The ring is planar in the free state.

According to the invention, there is provided a passageway 10 on the journal between the end 11 of the latter and the groove 9, the purpose of this passageway being explained hereinafter. Preferably, the passageway 10 has a semi-circular section and a depth which is roughly equal to that of the groove 9. It extends along a helix whose angle relative to the axis of the groove 9, in the region of the connection between the passageway and the groove, may be between 5 and 30°.

The passageway 10 is also shown in FIG. 2 in which can be seen also a centering aperture 12 whose purpose will be explained hereinafter.

Owing to the presence of the passageway 10, the assembly just described may be achieved by means of a method which is different from that employed usually and which lends itself to a thorough automatization. This method will be explained with reference to FIGS. 3 and 4. The roller 3, provided with its needles 4 and accompanied by the washer 5 and the cup 7, is engaged on a guide 20 which is centered relative to the journal owing to the presence of the aperture 12. By means of a thrust member 21, the assembly comprising the roller, the needles, the washer and the cup is made to slide along the journal as shown in FIG. 3. The ring 8 is fed to the journal since it is mounted on a holder 22 which comprises a screwthread 23 which has a semi-circular section and a pitch which is increased in the vicinity of its end. Preferably, the holder has an oblique end face so that when it bears against the end of the journal, its axis Y-Y is slightly inclined relative to the axis X-X of the journal.

It is then sufficient to exert a thrust in the direction of the arrow F1 on the end of the ring remote from the journal to cause it to slide along the screwthread of the holder and engage its other end in the gap defined between the passageway 10 and the skirt 7b of the cup. This thrust is exerted for example by means of a rotatable sleeve 24 which comprises an abutment surface 25 which comes in contact with the end of the ring. This is continued until the ring is completely received in the groove 7 where it resumes its original planar shape (FIG. 5).

There may also be provided a rotatable outer collar 26 which contains the ring and ensures that it does not expand excessively during the operation just described. This collar is preferably subjected to an alternating movement of rotation of small extent and high frequency so as to cancel out the friction of the ring against its inner wall when the ring is being inserted into its housing.

When it is placed in position, the ring maintains the cup in the same manner as in the prior method and the retention thus achieved is fully reliable. Indeed, as the ring is planar in the free state, it does not tend to become deformed so that one of its ends could become engaged in the passageway 10. Moreover, the surface of contact between this ring and the adjacent surface of the journal is only interrupted at the connection of the passageway 10 with the groove 9, which is insufficient to create a deformation and a disengagement of the ring under the effect of a force in the direction of the axis of the journal.

The assembling method is industrially much more rational and automatizable and yet the modifications to be made are particularly simple. Indeed, the passageway 10 may be produced easily and very cheaply by a cold forming operation along the axis of the tripod and in the course of which this passageway is formed simultaneously on each of the three journals of this tripod.

Further, disassembly is effected without difficulty, as in the prior method, by withdrawing in succession the roller, after radial deformation of the ears 7c, the needles, the ring, the cup and the washer.

Other advantages may also be mentioned:

the assembling method reduces the costs and avoids a repetitive and fastidious manual work;

it is much more reliable since the possibilities of defects and in particular omissions of needles are eliminated;

it enables the rollers to be provided with their needles previously, which is advantageous bearing in mind the matching which must be effected between the bore of the roller and the class of needles of corresponding diameter in order to obtain a very small play in the rotatable assembly, the needles having themselves in each class a diameter which is constant to within one micron. The mounting having the required precision is thus achieved with certainty.

There is no risk of confusion of the classes of rollers or needles;

although it is more advantageous, this method enables the same parts to be used as in the prior method.

Having now described my invention, what I claim as new and desire to secure by Letters patent is:

1. In an assembly comprising a journal, a roller rotatively mounted on the journal, rolling elements interposed between the journal and the roller and axially retained between means defining an annular radial support surface on the journal and an annular member in the vicinity of a free end of the journal, which annular member is held in position by an elastically yieldable split ring which is planar in the free state and trapped between the annular member and a groove in the journal the improvement comprising a passageway which is provided in the journal between the free end of the journal and said groove and is connected to said groove and has a substantially helical shape and a depth which is such that it defines with the adjacent annular member a gap permitting the insertion of the elastically yieldable ring.

2. An assembly as claimed in claim 1, wherein the passageway has a roughly semi-circular section.

3. An assembly as claimed in claim 1, wherein the angle between the passageway and the groove in the region of their connection is between about 5 and 30°.

* * * * *